(12) United States Patent
Moretti et al.

(10) Patent No.: US 6,607,179 B2
(45) Date of Patent: Aug. 19, 2003

(54) ROTATABLE STOPCOCK FOR A MALE COUPLING HAVING A 90° OFFSET CONNECTING PIECE

(75) Inventors: Erminio Moretti, Grenoble (FR); Gilles Perrin, Echirolles (FR)

(73) Assignee: A. Raymond & Cie. (FR)

( * ) Notice: Subject to any disclaimer, the term of this patent is extended or adjusted under 35 U.S.C. 154(b) by 0 days.

(21) Appl. No.: 10/204,076

(22) PCT Filed: Jan. 26, 2001

(86) PCT No.: PCT/EP01/00874
§ 371 (c)(1),
(2), (4) Date: Aug. 16, 2002

(87) PCT Pub. No.: WO01/61223
PCT Pub. Date: Aug. 23, 2001

(65) Prior Publication Data
US 2003/0015680 A1 Jan. 23, 2003

(30) Foreign Application Priority Data
Feb. 17, 2000 (DE) .......................... 100 07 204

(51) Int. Cl.⁷ ................................. F16K 5/04
(52) U.S. Cl. ........................ 251/309; 251/904
(58) Field of Search ................ 251/309–312, 251/297, 904, 304

(56) References Cited

U.S. PATENT DOCUMENTS

| 2,854,027 A | | 9/1958 | Kaiser et al. ......... 137/625.41 |
| 4,147,184 A | * | 4/1979 | Jess .......................... 251/312 |
| 4,425,935 A | * | 1/1984 | Gonzalez ................ 137/454.2 |
| 4,750,707 A | | 6/1988 | Johncox et al. ............. 251/304 |
| 4,778,152 A | | 10/1988 | Logman ...................... 251/314 |
| 4,809,949 A | | 3/1989 | Rakieski ..................... 251/310 |
| 4,854,545 A | | 8/1989 | Pezzarossi .................. 251/310 |
| 5,219,149 A | * | 6/1993 | Combeau .................... 251/309 |
| 6,003,546 A | * | 12/1999 | Thanscheidt ................ 251/297 |

FOREIGN PATENT DOCUMENTS

| DE | 20 11 660 A | 9/1971 |
| DE | 28 43 370 A | 4/1980 |
| DE | 197 28 234 A | 3/1999 |
| EP | 0 621 052 A | 10/1994 |

\* cited by examiner

*Primary Examiner*—Paul J. Hirsch
(74) *Attorney, Agent, or Firm*—Gifford, Krass, Groh, Sprinkle, Anderson & Citkowski, P.C.

(57) ABSTRACT

A rotatable stopcock for a plug-type coupling with an angled piece for connecting fluid lines. The stopcock including a turning knob portion and an integrally formed hollow pin portion. The knob portion includes two opposing ring segments having detent catches that positively engage a flange ring formed on the coupling housing wall. The pin portion is dimensioned to be received into a contact hole of the plug-type coupling such that rotating the stopcock after insertion causes the hollow pin portion to regulate the fluid flow through the plug-type coupling.

4 Claims, 2 Drawing Sheets

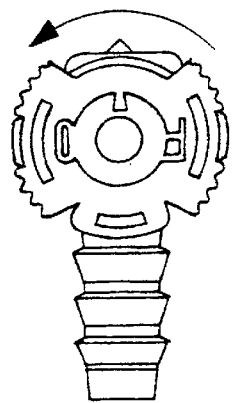
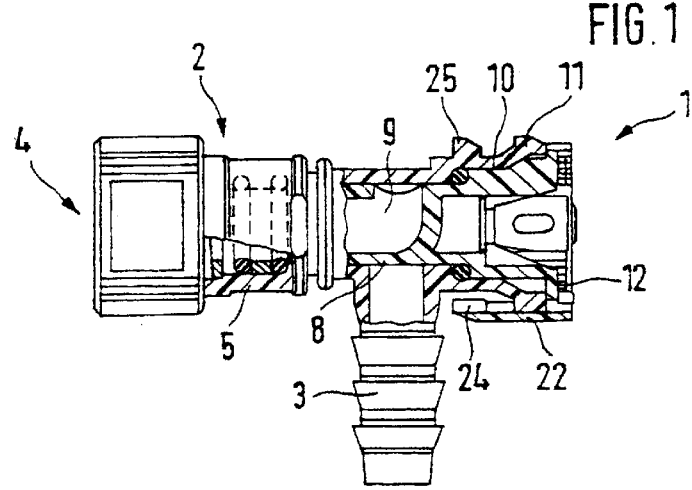
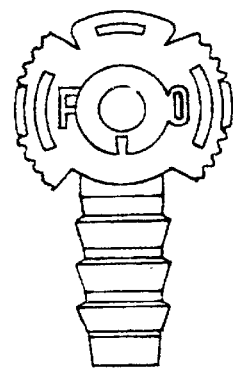
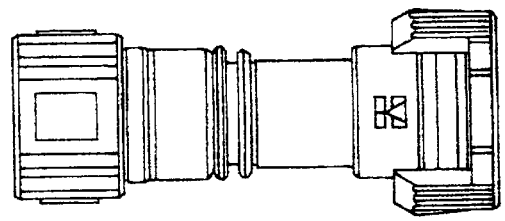
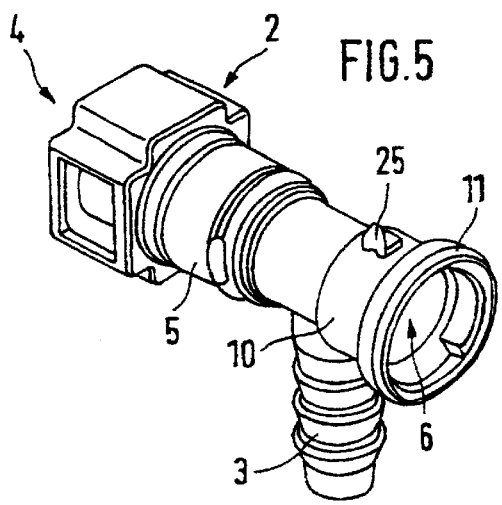
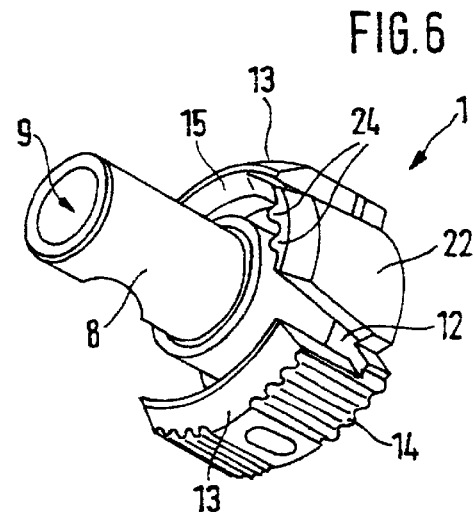

ROTATABLE STOPCOCK FOR A MALE COUPLING HAVING A 90° OFFSET CONNECTING PIECE

BACKGROUND OF THE INVENTION

The invention pertains to a rotatable stopcock for a plug-type coupling having a connector for connecting fluid lines and a mounting hole that is situated along the extension of one of the two lines and operates to receive a tube that is connected to the stopcock. The tube is provided with a through-bore that is angled by 90° in order to connect the coupling housing to the connector, wherein the pin is sealed relative to the mounting hole of the coupling housing directly behind the through-bore by means of a ring seal and provided with a turning knob that can be fixed relative to the coupling housing in the axial direction of the mounting hole.

A stopcock of this type is, for example, known from U.S. Pat. No. 4,854,545, and is used in connection with a connector and a perpendicular outgoing line. In this case, the tube is fixed in the axial direction of the mounting hole by means of a sleeve and a union nut and protrudes from the sleeve with a flattened cylindrical rod. A turning knob is attached to this rod and fixed thereon by means of a screw.

Consequently, this stopcock consists of many individual parts that need to be assembled and connected to the housing of the connector in order to ensure that the stopcock is able to fulfill its intended function. However, this assembly and connection process is associated with high production and assembly costs.

With reference to plug-type couplings for fluid lines that convey fuel, it is particularly important to interrupt the fuel flow by means of a stopcock before the coupling is disengaged. Although this could, in principle, be achieved by utilizing a conventional shut-off valve, this would also require a large number of individual parts, as well as their assembly.

SUMMARY OF THE INVENTION

The present invention is based on the objective of developing a stopcock for a plug-type coupling which can be inexpensively manufactured, as well as easily handled and mounted in the mounting hole of the plug-type coupling.

According to the invention, this objective is attained due to the fact that the housing wall on the mounting hole contains a peripheral flange, and the fact that two opposing ring segments are integrally formed onto the end wall of the turning knob. The ring segments extend concentrically to the outer wall and are provided with inwardly directed detent catches that positively engage behind the flange ring after elastically expanding the ring segments during the insertion of the tube into the mounting hole.

Due to the design of the housing of the plug-type coupling and the integrated stopcock, the fluid flow through the plug-type coupling can be rapidly and reliably interrupted and released again in an equally simple fashion. The tube also is reliably positioned in the mounting hole by the ring segments and, in particular, their engagement behind the flange ring of the coupling.

In order to ensure that the turning knob can be easily taken hold of and turned, the ring segments on the outer wall are usually knurled or ribbed. To reliably fix the turning knob in the open position, it is, according to another embodiment of the invention, proposed that a detent limb with two inwardly protruding detent teeth that extend past the outer wall be arranged between the two ring segments, such that the detent teeth cooperate with a detent notch integrally formed onto the outer wall of the coupling housing in such a way that the turning knob is locked in the open position of the stopcock.

BRIEF DESCRIPTION OF THE DRAWINGS

One embodiment of the stopcock according to the invention is illustrated in the figures and described in greater detail below. The figures show:

FIG. 1, a side view of a plug-type coupling with a connector and a stopcock, wherein the stopcock is partially sectioned in this figure;

FIG. 2, a top view of the same plug-type coupling with a stopcock;

FIG. 3, a front view of FIG. 1, wherein the stopcock is in the closed position;

FIG. 5, a perspective representation of the coupling housing;

FIG. 6, a perspective representation of the stopcock;

DETAILED DESCRIPTION OF THE PREFERRED EMBODIMENT

Figure 7:
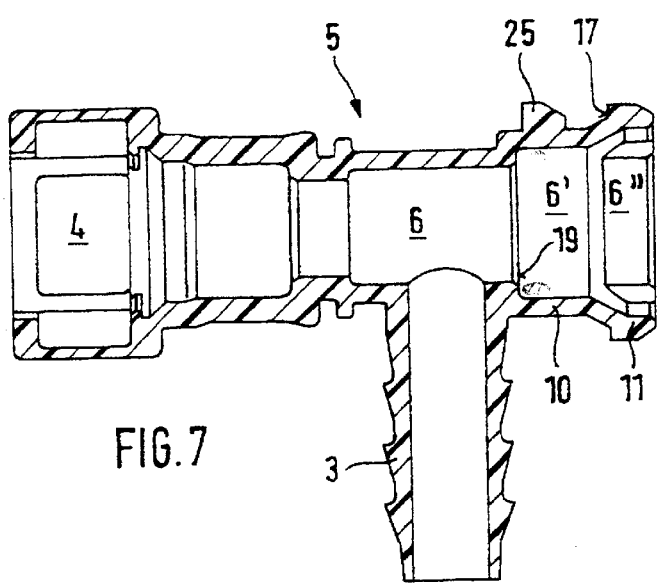
FIG. 7, a longitudinal section through an empty coupling housing.

A stopcock 1 operates to release and interrupt the fluid flowing into a plug-type coupling 2 that is provided with a connector 3 for connection with a fluid line not shown and disposed at an angle of 90°. In the embodiment shown in FIG. 1, the plug-type coupling 2 contains an opening 4 on the left side for inserting a part not shown that is conventionally provided with a peripheral holding rib which is locked in the coupling opening 4.

The perspective representation of the coupling housing 5 shown in FIG. 5 includes a mounting hole 6 disposed in axial alignment with the opening 4. The hole is adapted to rotatably accommodate the stopcock 1 shown in FIG. 6.

The coupling housing 5 may be manufactured of hard plastic by means of an injection molding process or of a suitable metal alloy. However, the stopcock 1 is integrally manufactured from a hard-elastic plastic material. According to FIGS. 8 and 9, the stopcock 1 consists of a turning knob 7 with a tube 8 that is integrally formed thereon. The central tube 8 contains a central through-bore 9 that is also angled by 90°. This through-bore begins at the end face along an axial extension of the opening 4 and ends along an axial extension of the connector 3 via a 90° angle.

Referring now to FIG. 7, an outside diameter of the tube 8 is adapted to be received inside the diameter of the mounting hole 6 in the region situated on both sides of the connector 3 and the tube can be turned relative to this region of the mounting hole 6. The mounting hole 6 contains a stepped hole portion 6' widening toward the inserting region and ends with a widening conical stepped passage 6".

At the end of the conical stepped passage 6", the housing wall 10 is provided with a peripheral flange ring 11 that serves for axially fixing the stopcock 1 relative to the coupling housing 5.

Figure 8:
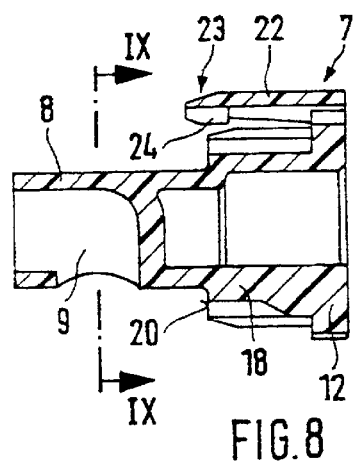
FIG. 8, a longitudinal section through the corresponding shut-off valve.
Figure 9:
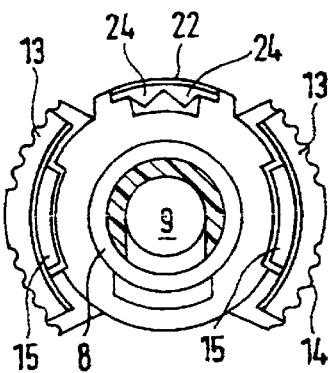
FIG. 9, a section through the shut-off valve along the line IX—IX in FIG. 8.
Figure 11:
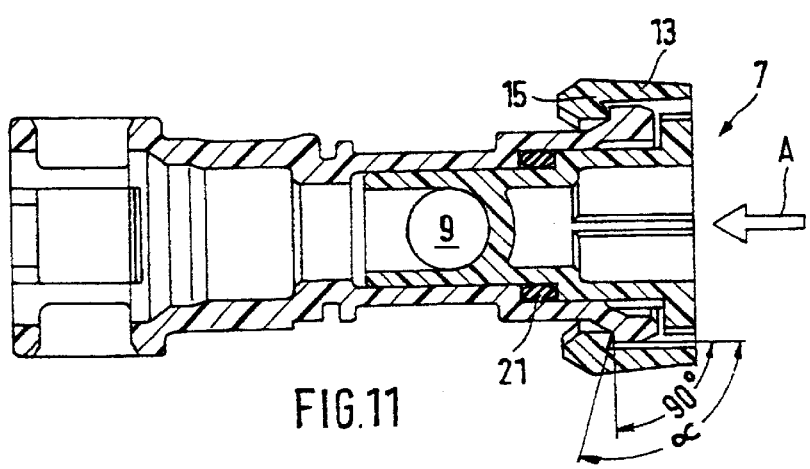

As shown in FIGS. 8 and 9, two opposing ring segments 13 are integrally formed onto the end face 12 of the turning knob 7, such that the ring segments extend concentrically to the outer wall 10 of the housing 5. The outside of these ring segments is provided with knurling 14 for easy grasping and turning of the turning knob 7. The inner side of the ring segments 13 is provided with a pair of detent catches 15 that slide over the flange ring 11 after elastically expanding the ring segments 13 during the insertion of the tube 8 into the mounting hole 6. Subsequently, these detent catches positively engage the flange ring as illustrated in FIG. 11.

In order to reliably prevent the stopcock 1 from being pressed out of the mounting hole 6 by high fluid pressure, the detent surfaces 16 of the detent catches 15 form an angle a of more than 90° relative to the radial contact surface 17 of the flange ring 11, with said angle being measured opposite the attachment direction "A" of the turning knob 7.

Again referring to FIG. 7, the outside diameter of the tube 8 contains a step 18 in the direction of the end face 12 which corresponds to the stepped passage 6' in the mounting hole 6. In this case, a ring seal 21 (FIG. 11) for preventing fluid from escaping at the turning knob 7 is installed between the opposing radial ring surfaces 19 and 20.

Figure 10:
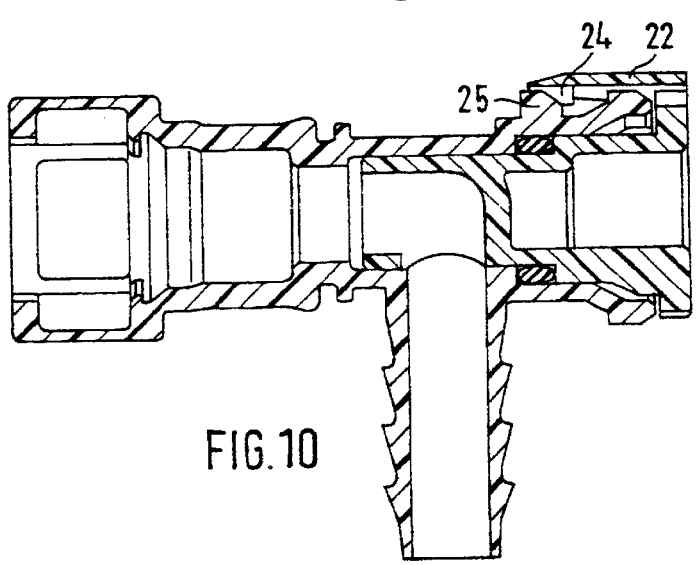
FIG. 10, the coupling housing according to FIG. 6 with an inserted shut-off valve in the open position, and FIG. 11, a representation according to FIG. 10 of the coupling housing with an inserted shut-off valve, however, turned by 90°.

To lock the stopcock in the open position, one additional detent limb 22 (FIG. 8) is provided on the end face 12 of the turning knob 7 in the region between the two ring segments 13. The detent limb 22 also extends past the outer wall 10 and points in the direction of the bent through-bore 9 with its expandable end 23. The detent limb 22 is also provided with two detent teeth 24 on its inner side as indicated in FIG. 9. A detent notch 25 is arranged on the housing wall 10 at the same distance from the flange ring 11. This detent notch is aligned relative to the detent teeth 24 of the detent limb 22 in such a way that the turning knob 7 is locked in the open position (see FIG. 10) of the stopcock.

What is claimed is:

1. A stopcock for a plug type coupling, the coupling having a housing having an axial through-bore having a coupling at one end and a mounting hole at an opposite end, said housing having a connector portion for mounting to a fluid line extending at an angle to the through-bore, the stopcock comprising:

a tube portion having a passage for receiving fluid from the through-bore, the inner passage portion curved through an angle to fluidly connect with the connector portion, a ring seal disposed in said through-bore between an outer surface of the stopcock and the housing;

a turning knob integral to said hollow pin portion and detachedly fixed relative to the coupling housing in axial direction of the contact hole, said turning knob comprising:

two opposing ring segments integrally formed on an end wall of said knob that extend concentrically to the housing wall about said contact hole, said ring segments having inwardly directed detents operative to positively engage a flange ring formed on the housing wall about said contact hole after elastically expanding during insertion of said tube portion into said contact hole.

2. The stopcock according to claim 1 further including a detent limb integrally formed with the turning knob between the ring segments and extending past said flange ring on the housing wall, said detent limb comprising:

an elastically extendable end that projects in the direction of the angled through-bore; and at least one detent tooth that complements a detent notch formed integrally with the housing wall such that when said at least one detent tooth and complementary detent notch are engaged said turning knob is locked in the open position whereby the stopcock is held open.

3. The stopcock according to claim 1 wherein the detent surfaces of said inwardly directed detents form an angle of more than 90 degrees relative to the radial contact surface of said flange ring formed on the housing wall, said angle being measured in a direction opposite the attachment direction of said turning knob.

4. The stopcock according to claim 2 wherein detent surfaces of said inwardly directed detents form an angle of more than 90 degrees relative to the radial contact surface of said flange ring formed on the housing wall, said angle being measured in a direction opposite an attachment direction of said turning knob.

* * * * *

UNITED STATES PATENT AND TRADEMARK OFFICE
CERTIFICATE OF CORRECTION

PATENT NO.     : 6,607,179 B2
DATED          : August 19, 2003
INVENTOR(S)    : Erminio Moretti It is certified that error appears in the above-identified patent and that said Letters Patent is hereby corrected as shown below:

<u>Column 4,</u>
Line 2, delete "inner"
Line 7, replace "hollow pin" with -- tube --.
Lines 10, 14, 17 and 19, replace "contact" with -- mounting --.

Signed and Sealed this

Fifteenth Day of June, 2004

JON W. DUDAS
*Acting Director of the United States Patent and Trademark Office*